United States Patent [19]

Rudelick

[11] 4,301,972
[45] Nov. 24, 1981

[54] MIXING FAUCET VALVE WITH DIVERTER AND ANTI-SYPHONING MEANS

[75] Inventor: John Rudelick, Milwaukee, Wis.

[73] Assignee: Milwaukee Faucets, Inc., Milwaukee, Wis.

[21] Appl. No.: 152,881

[22] Filed: May 23, 1980

[51] Int. Cl.³ .............................................. F16K 19/00
[52] U.S. Cl. .................................. 239/443; 137/597; 137/614.2; 137/625.17; 137/861
[58] Field of Search ............... 137/119, 597, 614.2, 137/625.17, 625.4, 625.41, 861; 4/192; 239/25, 32, 443

[56] References Cited

U.S. PATENT DOCUMENTS

| | | | |
|---|---|---|---|
| 1,777,434 | 10/1930 | Herzbrun | 137/597 |
| 2,507,467 | 5/1950 | Fredrickson | 137/119 X |
| 2,519,158 | 8/1950 | Symmons | 137/597 |
| 2,977,988 | 4/1961 | Drobilits | 137/625.4 X |
| 3,736,959 | 6/1973 | Parkison | 137/625.17 |

Primary Examiner—Robert G. Nilson
Attorney, Agent, or Firm—Arnstein, Gluck & Lehr

[57] ABSTRACT

A mixing faucet valve having a single check valve to prevent syphoning of liquid into a supply line in the event of reduced pressure in a line. The valve also includes a Venturi type arrangement for automatically diverting the outflow of liquid from a principal discharge spout to an auxiliary spray hose attachment when the valve to the spray hose is opened.

6 Claims, 3 Drawing Figures

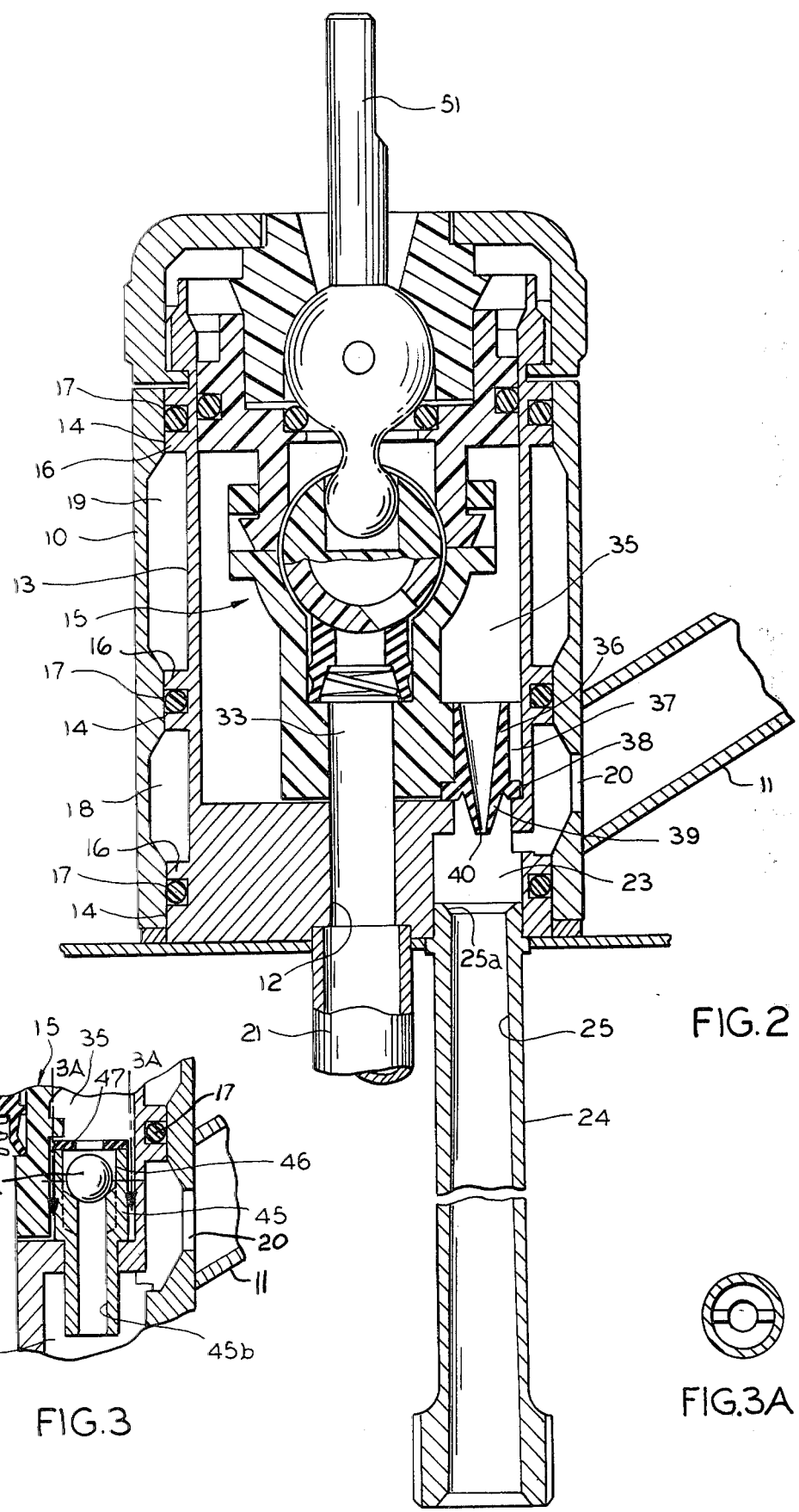

MIXING FAUCET VALVE WITH DIVERTER AND ANTI-SYPHONING MEANS

BACKGROUND OF THE INVENTION

The present invention relates to a mixing faucet valve having anti-syphoning means and means for selectively diverting unmixed or blended liquids to one of the plurality of possible outlets.

SUMMARY OF THE INVENTION

One of the objects of this invention is the provision of a mixing valve which will automatically divert the outflow of liquid from a principal discharge passage, such as a faucet spout, upon the manual opening of a control valve associated with an auxiliary passage, such as a spray hose attachment.

Another object of this invention is the provision of a mixing valve of this type incorporating anti-syphon means of novel simple construction to prevent any upstream syphoning of the water or liquid back through the valve, in the event of a reduced pressure in a liquid supply line.

BRIEF DESCRIPTION OF THE DRAWINGS

FIG. 2 is a vertical cross-sectional view of one embodiment of my invention showing the valve assembly mounted in the body of a mixing valve;

FIG. 3 is a similar but fragmentary view showing a modified embodiment of my invention;

FIG. 3a is a horizontal cross-sectional view taken on the line 3a—3a of FIG. 3 showing the ball and cage check valve of my invention with the ball removed.

BRIEF DESCRIPTION OF THE PREFERRED EMBODIMENTS

Figure 1:
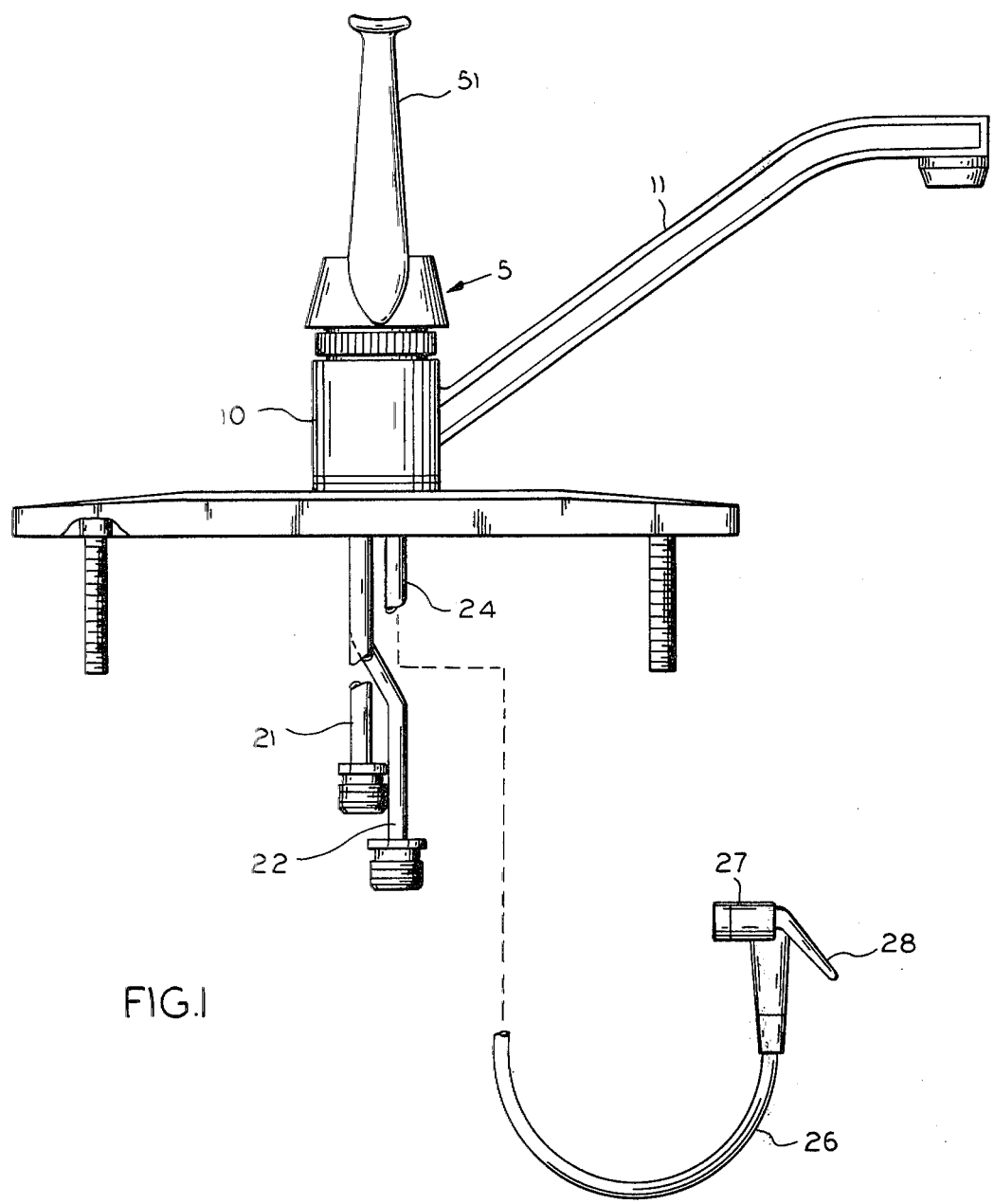
FIG. 1 is a front elevational view of a mixing faucet assembly in combination with a spray attachment.

Referring to FIGS. 1 and 2 of the drawings, my invention is shown as embodied in a single lever faucet 5, although it will be understood that my invention has application to other types of faucets and valves. The faucet includes a generally cylindrical outer shell or casing 10 provided with a spout 11. The casing 10 encloses a body portion 13 of the valve 15 presently to be described. The casing is provided with three axially spaced bore sections 14, 14, 14 of reduced diameter. The body portion 13 is formed with three correspondingly spaced circumferentially extending ridges 16, 16, 16, each of which is grooved to receive an O-ring 17. Two axially spaced annular fluid passages 18 and 19 thus are defined between the body portion 13 and the interior of the casing 10. An opening 20 in the wall of the casing 10 affords communication between the lower annular passage 18 and the spout 11 for the passage for water or other liquid. A pair of passages 12 are provided in the lower end of the body portion 13 and are adapted, one to receive a cold water inlet pipe 21 and the other a hot water inlet pipe 22, respectively. A third passage or chamber 23 provided in the lower end of the body portion 13 receives the upper end of a Venturi tube 24, to the lower end of which is connected a flexible hose 26 leading to a spray head 27 having a manually operable valve 28. The upper end of each passage 12 communicates respectively with a passage 33 in the valve cartridge 15. The structure and operation of the valve cartridge 15 is fully described in copending application Ser. No. 70,557, entitled SINGLE LEVER FAUCET PLASTIC CARTRIDGE VALVE, now U.S. Pat. No. 4,226,260, and forms no part of the present invention.

A check valve 36 is secured within the body portion 13 in substantially coaxial registration with the Venturi tube 24 which includes a truncated conical bore 25 with its maximum constriction being uppermost and adjacent a flared mouth 25a. The check valve 36 is formed of elastomeric material and is of the type commonly known as a duckbill. Such valves are of conventional construction and are manufactured by Vernay Laboratories, Inc. of Yellow Springs, Ohio.

As seen in FIG. 2, the valve 36 includes a cylindrical body 37 having an annular flange 38 and a pair of thin cooperating angularly related lips 39 having a slit opening 40 at the juncture of the lips 39. This slit opening is disposed above the entrance to the Venturi tube 24 but below passage 20. As is apparent the valve 36 provides a restricted passage between chambers 35 and 23 which functions to increase the velocity of flow of water or liquid between the chambers.

In operation, when the control handle 51 of the faucet 5 is moved to open position, water enters the body portion 13 from the hot and cold water supply lines 21 and 22 and passes through the cartridge 15 into chamber 35 of the body portion 13 and then through check valve 36. During normal use the spray hose valve 28 is closed and water flowing through the check valve 36 will be caused to flow into chamber 23 and through opening 20 into the faucet spout 11. In the event of a negative pressure in the supply lines 21, 22, the slit opening 40 closes to prevent a reverse flow or syphoning of liquid into either supply line.

It is noted that the slit opening 40 is substantially smaller than the constricted bore 25 of tube 24. Thus, when the spray hose valve 28 is opened, the flow from check valve 36 will pass directly into the mouth of tube 24 with increased velocity and will flow through hose 26 into the spray head 27. Such flow results in a negative pressure in chamber 23 so that there is no concurrent flow of water through the faucet 11. When valve 28 is closed liquid will flow from chamber 23 through passage 20 into spout 11.

In the embodiment illustrated in FIG. 3, the modification differs only in certain respects from the device shown in FIG. 2, accordingly, like reference numerals have been applied to like parts. In this embodiment the duckbill type check valve 36 is replaced by a nozzle 45 which includes at its upper end a ball and cage type check valve 46 surmounted by a rubber washer 47. The ball 46a has a specific gravity which is less than that of water so that it will float to the top of the cage and normally will be in contact with washer 47 when the valve cartridge 15 is in closed condition. The nozzle is disposed substantially in the same relative position occupied by the check valve 36. The bore 45b of the nozzle provides a restricted passage between chambers 35 and 23 which terminates somewhat above tube 24 but below passage 20.

The operation of this embodiment is substantially identical to that hereinabove described. In the event the supply lines 21, 22 are subjected to a negative pressure the ball in check valve 46 will move into engagement with washer 47 thereby preventing syphoning of water into either of the supply lines.

Various changes coming within the spirit of my invention may suggest themselves to those skilled in the art; hence, I do not wish to be limited to the specific embodiments shown and described or uses mentioned, but intend the same to be merely exemplary the scope of my invention being limited only by the appended claims.

I claim:

1. An anti-syphoning mixing faucet valve comprising, a casing having an outlet communicating with a spout, a body portion having a valve chamber and a discrete auxiliary chamber, said auxiliary chamber having a discharge opening communicating with said spout, said body portion having a pair of inlet passages each adapted to be connected to a liquid supply line, a control valve received in said valve chamber and having a pair of inlet passages each communicating with a respective one of said first mentioned inlet passages, a tube communicating with said auxiliary chamber, a spray head having a manually operable valve connected to said tube, check valve means intermediate said valve chamber and said auxiliary chamber for increasing the velocity of flow of liquid from said valve chamber whereby when said manually operable valve is opened liquid will flow into said spray head and when manually operable valve is closed liquid will flow through said spout, said check valve means adapted to close opposite to the direction of normal flow in said auxiliary chamber.

2. The invention as defined in claim 1 in which the check valve comprises a ball and cage.

3. The invention as defined in claim 1 in which the check valve comprises a duckbill.

4. An anti-syphoning mixing faucet valve comprising an outer casing having an outlet communicating with a spout, a generally cylindrical body portion having a bottom wall defining a valve chamber and a discrete auxiliary chamber, said auxiliary chamber having a discharge opening communicating with said spout, said bottom wall having a pair of inlet passages each adapted to be connected to a liquid supply line, a control valve received in said valve chamber and having a pair of inlet passages each communicating with a respective one of said bottom wall inlet passages, a connecting passage between said valve chamber and said auxiliary chamber, a check valve received in said connecting passage and adapted to close opposite to the direction of normal flow through said connecting passage, a Venturi tube communicating with said auxiliary chamber and having its mouth proximately spaced below and in vertical registration with the down stream end of said check valve, a spray head having a manually operable valve connected to said Venturi tube, the flow from said check valve passing directly into said Venturi tube and then into said spray head when said manually operable valve is opened, and the flow from said check valve passing into said spout when said manually operable valve is closed.

5. The invention as defined in claim 4 in which the check valve comprises a ball and cage.

6. The invention as defined in claim 4 in which the check valve comprises a duckbill.

* * * * *

UNITED STATES PATENT OFFICE
CERTIFICATE OF CORRECTION

PATENT NO. : 4,301,972
DATED : November 24, 1981
INVENTOR(S) : JOHN RUDELICK

It is certified that error appears in the above-identified patent and that said Letters Patent are hereby corrected as shown below:

IN THE CLAIMS:

Claim 1, line 22, after the word "when" add --said--

Signed and Sealed this

Twenty-third Day of February 1982

[SEAL]

*Attest:*

*Attesting Officer*

GERALD J. MOSSINGHOFF

*Commissioner of Patents and Trademarks*